Sept. 13, 1966   J. D. RYAN ETAL   3,272,900
METHOD OF FABRICATION OF LAMINATED STRUCTURES
Filed May 13, 1963

INVENTORS
Joseph D. Ryan and
BY Paul P. Mattimoe

Nobbe & Swope
ATTORNEYS

United States Patent Office 3,272,900
Patented Sept. 13, 1966

3,272,900
METHOD OF FABRICATION OF LAMINATED STRUCTURES
Joseph D. Ryan and Paul T. Mattimoe, Toledo, Ohio, assignors to Libbey-Owens-Ford Glass Company, Toledo, Ohio, a corporation of Ohio
Filed May 13, 1963, Ser. No. 279,754
8 Claims. (Cl. 264—135)

This application is a continuation-in-part of our copending application Serial No. 57,477, filed September 21, 1960.

The present invention relates generally to an improved method of producing laminated electrically conductive structures.

The particular type of laminated structure with which this invention is concerned comprises two sheets of rigid plastic separated by an interposed layer of non-brittle plastic material bonded to the sheets to form a composite structure. The inner surface of at least one of the plastic sheets is provided with a transparent, electrically conductive film. Such laminated, electrically conductive structures have come to be widely used as windows for aircraft and other vehicles and, when connected to a suitable power source, act to prevent fogging and icing conditions on the windows.

One laminating procedure by which such structures are made comprises positioning two rigid plastic sheets in spaced parallel relation to one another in a suitable fixture and then flowing or otherwise casting the plastic interlayer material in the form of a solution into the space between the plastic sheets, with the plastic material then setting or curing into a non-brittle transparent interlayer. While this procedure results in the formation of a satisfactory laminated structure where the inwardly facing surfaces of the plastic sheets are directly contacted by the flowing or cast plastic, it has been found that the cast plastic has an adverse effect on an electrically conducting film previously applied to one of the plastic sheets.

It is, therefore, the primary object of this invention to produce a laminated structure of the above character which has a continuous, unbroken electrically conductive film applied thereto.

Another object of this invention is to provide an improved method of producing laminated plastic structures in which at least one of the plastic sheets has applied thereto a transparent electrically conductive film.

Another object of this invention is to provide an improved method of producing laminated structures of the above character by first providing the electrically conductive film with a transparent protective coating preparatory to the laminating operation.

Other objects and advantages of the invention will become more apparent during the course of the following description when read in connection with the accompanying drawings.

In the drawings, wherein like numerals are employed to designate like parts throughout the same:

Figure 1:
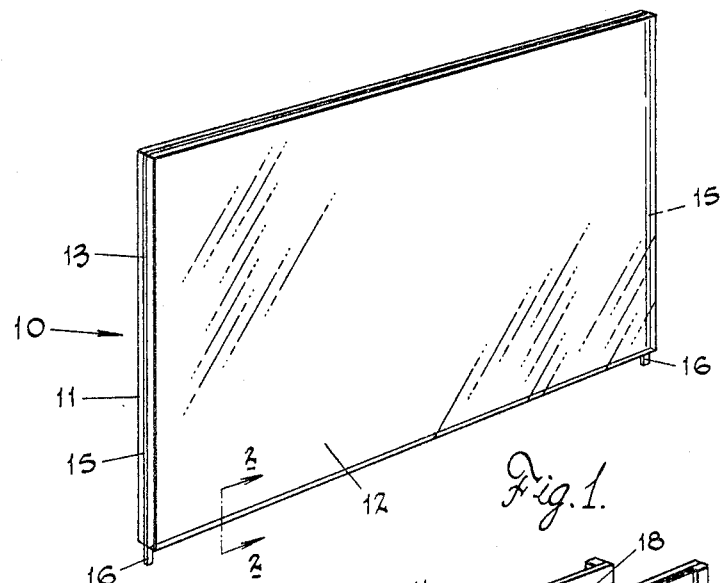
FIG. 1 is a perspective view of a laminated structure produced in accordance with the method of the present invention.
Figure 2:
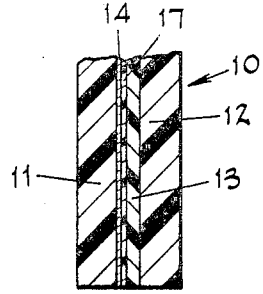
FIG. 2 is a vertical transverse sectional view taken on line 2—2 of FIG. 1.

Referring now to the drawings, there is shown in FIG. 1, an electrically conductive laminated structure 10 which comprises two sheets 11 and 12 of rigid plastic, an interposed layer of flexible plastic 13, and an electrically conductive film 14 (FIGS. 2 and 3) on one of the sheets 11 provided with suitable electrodes 15 along two opposed marginal edges thereof and in contact with the electrically conductive film. The sheets 11 and 12 may be made from various compositions, such as a polymer of diethyleneglycol bis-allylcarbonate, acrylic resins, or a cast mixture of styrene and an unsaturated polyester.

Figure 3:
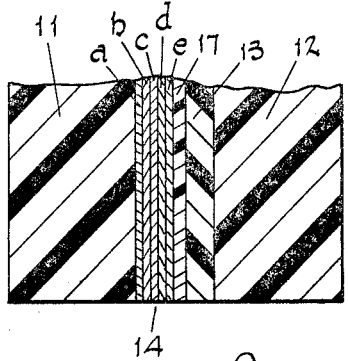
FIG. 3 is a fragmentary sectional view illustrating a further embodiment of the invention wherein the electrically conductive film is comprised of a series of layers.

The electrically conductive film 14 may comprise a single layer of a metal such as gold, nickel, iron, silver or copper (FIG. 2), which is thermally evaporated onto the plastic sheet 11 or, preferably, it may comprise a series of layers placed over each other, one of which is a metal of the above group (FIG. 3). With regard to this latter embodiment, since the plasticizer in the plastic sheet could adversely affect the conductive characteristics of a film of any of the above metals, it has been found preferable to initially apply a sealing layer on the surface of the plastic and then to cover the sealing layer with an adhesive layer that will permanently and directly adhere by molecular forces to both the sealing layer and a subsequent layer such as the conducting film layer. To further strengthen and protect the conducting film layer, an adhesive layer may be applied thereover with a final protective layer being placed thereupon. For this purpose, and by way of example, as shown in FIG. 3, the sealing layer $a$, thermally evaporated onto the surface of the plastic sheet 11, may be of quartz, titanium dioxide, aluminum oxide, chromium oxide or equivalent material. The adhesive layer $b$ is generally composed of a metal oxide such as of lead, silver, aluminum, magnesium, nickel, zinc, thorium, and other rare earth metallic oxides which, as aforementioned, are highly adherent to the surface of any material forming the sealing layer as well as to the metals forming the electrically conductive layer indicated at $c$.

Over the conductive metal layer $c$, an adhesive layer $d$ is placed; the latter being formed of a metallic oxide such as described above in connection with the adhesive layer $b$. The adhesive layer $d$ acts to secure a protective film layer $e$, such as quartz, over the conductive layer. This protective film layer $e$ serves to mechanically protect the conductive film layer from mars or scratches which tend to break some of the electrical paths across the film thereby causing current concentrations or localized heating to develop.

To connect the electrically conductive film 14 to a power source, electrodes 15 are provided along a pair of opposed marginal edges of the film. In this connection, in the event the multiple layer film is employed, the electrodes may be placed in contact with the film layer $c$ before the adhesive layer $d$ and protective layer $e$ are placed thereover, the layers $d$ and $e$ being masked along the marginal edge portions; or the layers $d$ and $e$ may be removed so as to allow the electrode material, such as an air-dry silver, to be placed in contact with the film layer $c$. Usually, before the actual laminating operation, each electrode 15 is equipped with an outwardly extending connector 16 comprising a strip or braid of copper or silver.

As above mentioned, with the use of the multiple layer electrically conducting film 14, the layer $e$ thereof serves to protect the electrically conducting film layer $c$ from surface mars or scratches and therefore affords certain advantages over the use of the single metal film, particularly during handling of the filmed sheets in assembling the laminated units. It is now known, however, that despite the protective nature of the layer e, in the fabrication of an all-plastic, electrically conducting laminated structure, the casting material, from which the interlayer 13 is formed, tends to destroy the layers d and e above the conductive film layer c with a resultant crazing or crinkling of the latter. Crazing of the layer c is discernible as a pattern of very fine cracks in the electrically conducting film. This is highly objectionable since the electrically conductive properties of the film are either completely destroyed or so impaired as to produce variable areas of resistance and consequential hot spots. In any event, the electrically conductive film 14, whether composed of a single metal layer or a plurality of layers as previously defined, immediately undergoes electrical failure when voltage is applied thereto, thus destroying the utility of the laminated structure for the purpose of de-fogging or de-icing.

Figure 4:
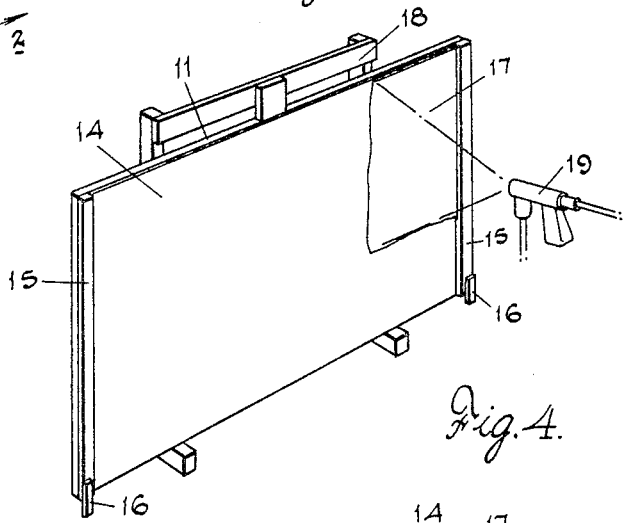
FIG. 4 is a view illustrating the application of the protective coating to the electrically conductive film.

To overcome these difficulties, the present invention contemplates providing a protective coating 17 on the film 14, which coating is not affected by the cast material and thus prevents direct contact between the film and the cast material and the adverse effects resulting therefrom. The protective coating 17 is preferably in the nature of a polyvinyl alcohol coating adapted to completely cover the electrically conducting metal film 14 including the protective layer e if the latter is present. As illustrated in FIG. 4, the coating 17 can be applied by supporting the plastic sheet 11 on a fixture 18 and spraying the polyvinyl alcohol in solution onto the filmed surface by means of a spray gun 19.

It has been found that the performance of such a coating may be improved by additives which serve to insolubilize the film of polyvinyl alcohol and promote adhesion between the film and the interlayer material. One such additive which accomplishes these purposes is the chemical compound methacrylato-chromic-chloride. In preparing the preferred composition of the protective coating, a 1% solution of methacrylato-chromic-chloride is prepared by dissolving one part of the material in ninety-nine parts of distilled water. The pH of this solution is adjusted with a glass electrode pH meter to a value between 5.0 and 6.0 using dilute (1 to 10) ammonium hydroxide. To 100 cc. of this solution is then added 2.5 grams of polyvinyl alcohol while stirring vigorously.

A preferred grade of polyvinyl alcohol for this purpose has a viscosity of approximately 60 centipoises as measured at 20° C. in a solution of 4 parts by weight of the polyvinyl alcohol in 96 parts by weight or distilled water. The polyvinyl alcohol content of the preferred material, as expressed in terms of percent hydrolysis, is 99 to 100%. It has further been found that other grades of polyvinyl alcohol can be used to good advantage to obtain a good protective coating for the electrically conductive film 14. For example, a product characterized by a viscosity of 25 centipoises and a percent hydrolysis of 87 to 89 has been employed successfully. Likewise, by using lower viscosity polyvinyl alcohol characterized by a viscosity of approximately 5 centipoises and a percent hydrolysis of 88 to 89, satisfactory coatings are obtained.

After the addition of the polyvinyl alcohol to the above-described solution of methacrylato-chromic-chloride has been made, the mixture is heated, with continued stirring, until the polyvinyl alcohol is completely dissolved. The solution is then cooled to room temperature and 8.3 cc. of n-butanol per 100 cc. of solution is added. The resulting solution is then ready to be sprayed over the film 14.

Preparatory to the actual spraying of the solution and with the plastic sheet 11 supported on the aforementioned fixture 18, the filmed surface is first cleaned as by blowing with an air gun. The spray gun 19 is set at an atomizing air pressure of 40 pounds with the fluid needle opened one turn and the spreader valve opened one-half turn. The protective coating 17 is applied by conventional cross-spraying technique which includes making a series of passes of the spray gun in a substantially horizontal direction followed by a series of passes in a vertical direction.

After fully covering the filmed surface of the plastic sheet 11 with a first coating of the solution, the sheet is dried in a circulating air oven at 150° F. for fifteen minutes after which a second spray coating is applied to the surface thereof. The coating 17 is then cured and dried by placing the sheet 11 in an atmosphere of 150° F. temperature, as in an air oven, for a period of two hours. The plastic sheet 11 with the electrically conducting film 14 protected by the polyvinyl alcohol coating 17 is now ready to be laminated with the plastic sheet 12.

Figures 5, 6:
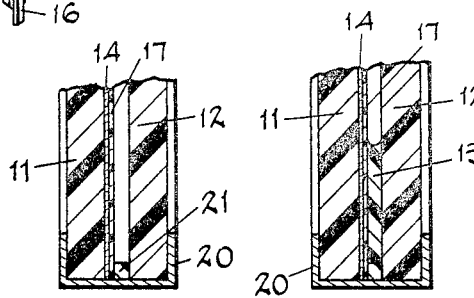
FIG. 5 is a fragmentary cross-sectional view of a pair of rigid plastic sheets arranged in spaced parallel relation preparatory to laminating.
FIG. 6 is a similar cross-sectional view of the plastic sheets during laminating.

In the laminating process, the plastic sheets 11 and 12 are arranged in spaced parallel relation as shown in FIG. 5, with the inwardly facing surface of the sheet 11 being covered by the relatively thin polyvinyl alcohol coating 17 which protects the film 14. By way of example only, the sheets 11 and 12 may be mounted in parallel relation in a U-shaped frame 20 and spaced from one another as by strips 21 of a plastic material that is preferably a polymer of the same material used for the preparation of the plastic interlayer 13. Otherwise, spacers of other suitable materials can be placed along and between the marginal edges of the sheets 11 and 12 and removed, in one way or another, after the casting material is polymerized.

The castable interlayer material generally employed is a suitable polyester composition of the soft flexible type. One such composition may be a copolymer of styrene with an unsaturated polyester. On the other hand, it is known that other polyester compositions can be employed to equally good advantage. Thus, satisfactory laminated plastic structures have been produced with an interlayer formed of a copolymer of 25% methylmethacrylate with 75% by weight of an unsaturated polyester comprised of the reaction product of maleic anhydride with a mixture of hexamethylene and propylene glycols.

As illustrated in FIG. 6, when the liquid castable plastic interlayer 13 is introduced into the space between the plastic sheets, it will move along and in contact with the inwardly directed surface of the plastic sheet 12 and the protective polyvinyl alcohol coating 17 on the electrically conductive film 14. As brought out above, it has been found that, due to the provision of the protective coating 17, the electrically conductive film 14 will not be in any way adversely affected. On the other hand, if the protective coating were not present and the plastic interlayer material moved along the electrically conductive film in direct contact with the metal layer, or in contact with the layer e if the multiple layer film is employed, there would be a tendency for the conductive film to become chemically attacked, crazed or otherwise marred. After the space between the plastic sheets has been completely filled, the completed structure is subjected to an elevated temperature which will cure the liquid plastic interlayer material and cause it to adhere firmly to the plastic sheet 12 and the protective coating 17.

While, as previously mentioned, polyvinyl alcohol has been found to be a preferred material to comprise the protective coating, various other substances could be employed in accordance with the invention. For example, carboxy methyl cellulose and hydroxy ethyl cellulose might be used as well as some water soluble polymers which are capable of being applied as film-forming coatings. In this respect, formulations of these latter materials should include additives which serve to insolubilize the protective materials and promote adhesion between the film and the interlayer material. For example, methyl cellulose might be employed in accordance with the invention utilizing urea formaldehyde as an insolubilizing additive.

It is to be understood that the forms of the invention herewith shown and described are to be taken as illustrative embodiments only of the same, and that various modifications in the compositions and specific procedures discussed may be resorted to without departing from the spirit of the invention.

We claim:

1. A method of producing a laminated electrically conductive structure, comprising applying a transparent electrically conductive film to a first plastic sheet, applying a protective coating over said film, arranging said first sheet in spaced relation to a second plastic sheet, with the protective coating toward said second sheet, casting a flowable plastic material into the space between said sheets and in contact with the inner surface of said second sheet and the protective coating on said first sheet, said protective coating being effective to chemically protect and inhibit crazing of said electrically conductive film and prevent contact between said film and said flowable plastic material, and curing the structure whereby said plastic material sets to form a flexible plastic interlayer bonding the sheets into a unitary structure.

2. A method of producing a laminated electrically conductive structure as claimed in claim 1, in which said protective coating is sprayed on said first sheet in a solution and subsequently dried.

3. A method of producing a laminated electrically conductive structure as claimed in claim 1, in which the protective coating is a transparent layer of polyvinyl alcohol.

4. A method of producing a laminated electrically conductive structure as claimed in claim 3, in which the protective coating is made adherent to the plastic interlayer and is made insoluble by the addition of methacrylato-chromic-chloride to the polyvinyl alcohol.

5. A method of producing a laminated electrically conductive structure as claimed in claim 3, in which the protective coating comprises a solution of 1 part of methacrylato-chromic-chloride in 99 parts of distilled water, 100 cc. of which solution is added to 2.5 grams of polyvinyl alcohol by vigorous stirring, and to the resulting solution is added n-butanol in a proportion of 8.3 cc. to 100 cc. of the polyvinyl alcohol solution.

6. A method of producing a laminated electrically conductive structure as claimed in claim 1, in which said electrically conductive film comprises a plurality of layers and is formed by first applying an adhesive layer to the surface of said first plastic sheet, applying a transparent electrically conductive metal layer over said adhesive layer, applying a second adhesive layer over said metal layer, and applying a protective layer over said second adhesive layer to mechanically protect said metal layer.

7. A method of producing a laminated electrically conductive structure as claimed in claim 1, in which a sealer layer is applied to said first plastic sheet prior to said electrically conductive film.

8. A method of producing a laminated electrically conductive structure as claimed in claim 6, in which a sealer layer is applied to said first plastic sheet prior to said first adhesive layer.

References Cited by the Examiner
UNITED STATES PATENTS

| | | | |
|---|---|---|---|
| 2,091,615 | 10/1934 | Rohm et al. | 264—261 |
| 2,236,046 | 3/1941 | Watkins | 156—99 |
| 2,237,275 | 12/1943 | Ryan | 156—99 |
| 2,507,036 | 5/1950 | McCrumm et al. | 219—19 |
| 2,864,928 | 12/1958 | Danford | 219—19 |
| 3,001,901 | 9/1961 | Barklet | 156—102 XR |

References Cited by the Applicant
UNITED STATES PATENTS

| | | |
|---|---|---|
| 2,374,056 | 4/1945 | Watkins. |
| 2,427,557 | 9/1947 | Gregorius. |
| 3,061,490 | 10/1962 | Ryan. |
| 3,089,799 | 5/1963 | Domicone. |

ROBERT F. WHITE, *Primary Examiner.*

EARL M. BERGERT, *Examiner.*

P. DIER, T. J. CARVIS, *Assistant Examiners.*